(12) United States Patent
Akiba

(10) Patent No.: US 12,156,164 B2
(45) Date of Patent: Nov. 26, 2024

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Tomohiro Akiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 362 days.

(21) Appl. No.: 17/866,141

(22) Filed: Jul. 15, 2022

(65) Prior Publication Data

US 2023/0019378 A1   Jan. 19, 2023

(30) Foreign Application Priority Data

Jul. 19, 2021   (JP) ................................ 2021-118662

(51) Int. Cl.
*H04W 60/04* (2009.01)
*H04W 60/06* (2009.01)

(52) U.S. Cl.
CPC ........... *H04W 60/04* (2013.01); *H04W 60/06* (2013.01)

(58) Field of Classification Search
CPC ....... F16L 21/08; F16B 21/183; F16B 21/073; F16B 2/08
USPC ..................................................... 455/435.1
See application file for complete search history.

(56) References Cited

U.S. PATENT DOCUMENTS

| | | | | |
|---|---|---|---|---|
| 9,519,901 B1* | 12/2016 | Dorogusker | ..... | G06Q 20/40145 |
| 2010/0248720 A1* | 9/2010 | Millet | ................ | H04W 12/069 |
| | | | | 455/435.1 |
| 2011/0300875 A1* | 12/2011 | Kim | ........................ | G01S 19/47 |
| | | | | 455/456.1 |

FOREIGN PATENT DOCUMENTS

CA       2655879 A1 *  8/2010  ............ H04L 12/66

OTHER PUBLICATIONS

RS Components, 11 Internet of Things (IOT) Protocols You Need to Know About, Apr. 2015, pp. 1-7 (https://www.rs-online.com/designspatk/eleven-internet-of-things-iot-protocols-you-need-to-know-about).

* cited by examiner

*Primary Examiner* — Tanmay K Shah
(74) *Attorney, Agent, or Firm* — Canon U.S.A., Inc. IP Division

(57) ABSTRACT

In processing of initializing a setting of a communication parent device, whether a communication child device has been registered is determined. In a case where the communication child device has been registered, a user is notified that the communication child device has been registered, and the user is guided to registration removal processing for the communication child device. In a case where removal of registration of the communication child device is instructed by the user's operation, registration information of the communication child device in the communication parent device is deleted.

8 Claims, 7 Drawing Sheets

FIG. 6

WIRELESS CHILD DEVICE HAS BEEN REGISTERED. WOULD YOU LIKE TO INITIALIZE ALL SETTINGS WITHOUT REMOVING REGISTRATION OR REMOVE REGISTRATION AND INITIALIZE?

( CANCEL INITIALIZATION )  ( INITIALIZE )  ( REMOVE REGISTRATION AND INITIALIZE )

FIG. 7

YOU NEED TO PERFORM REMOVING REGISTRATION OF WIRELESS CHILD DEVICE SEPARATELY. IS IT OK?

( YES )  ( BACK )

COMMUNICATION APPARATUS, CONTROL METHOD FOR COMMUNICATION APPARATUS, AND STORAGE MEDIUM

BACKGROUND

Field

The present disclosure relates to a communication apparatus, a control method for the communication apparatus, and a storage medium.

Description of the Related Art

Various kinds of standards are used in wireless communication devices that perform communication using radio waves. Examples of the standards include (i) the Institute of Electrical and Electronics Engineers (IEEE) 802.11a/b/g/n standards used for so-called wireless local area network (LAN) or Wireless Fidelity (Wi-Fi), and (ii) Bluetooth® that has been widely used in headphones, and keyboards.

In addition to the above-described standards, ZigBee® and Z-Wave are also used, and each of the standards is characterized by frequency, transmission distance range, power consumption, transfer rate, price, and the like. Information regarding various kinds of communication standards is discussed in DSjp "11 Internet of Things (IoT) Protocols You Need to Know About" (on-line), posted on Feb. 20, 2017 (searched on Jun. 16, 2021)<URL: https://www.rs-online.com/designspark/11internet-of-things-iot-1.

To start communication between devices in conformity with any of the above communication standards, the devices need to perform registration processing with respect to each other. Once the registration processing in the devices serving as a parent device and a child device is performed, communication can be performed between the parent device and the child device. For example, in a home automation system, the parent device serves as a central control apparatus, the child device can be, for example, a human detection sensor, an infrared sensor, and the like, and the states of various sensors can be monitored using the central control apparatus in accordance with a communication standard.

In a case of the configuration of the above-described home automation system, the parent device can delete various kinds of settings of a product on its own and bring the product into an initial state (initialization). Since initialization processing is intended to return the product to an initial state, the parent device deletes almost all settings; the parent device deletes even registration information regarding wireless communication, while the child device maintains the registration information. In a communication standard, such as Z-Wave, in light of security concerns and the like, a plurality of child devices can be registered in a parent device, whereas only a single parent device can be registered in a child device. Thus, registration processing in a child device cannot be newly performed unless the registration with respect to the parent device is removed. Consequently, in a case of such a communication standard, even when an attempt is made to re-register the initialized parent device in the child device or an attempt is made to register the child device in another parent device, such an attempt fails as long as the child device remains in a registered state. The registered state of the child device can be resolved by initialization of the child device, however, an operation method for the initialization can often be complicated in a child device that does not have an operation panel, which may be disadvantageous for a user. In another example case, if a child device has not been notified of initialization of a parent device, the child device cannot determine whether the parent device is initialized even in a case where the registration information is deleted on the parent device, and the user on the child device may be confused about why communication has become unable to be performed.

SUMMARY

According to various embodiments of the present disclosure, a communication apparatus that forms a wireless communication system together with an external communication apparatus, by the communication apparatus and the external communication apparatus mutually registering each other as apparatuses capable of performing communication. The communication apparatus includes a determination unit configured to determine, in response to receipt of an instruction for initialization, whether an external communication apparatus registered in the wireless communication system is present within a communication range, and a notification unit configured to issue, in a case where the determination unit determines that a registered external communication apparatus is present within the communication range, a notification for removing registration of the registered external communication apparatus before the initialization is performed.

Further features of the present disclosure will become apparent from the following description of example embodiments with reference to the attached drawings.

BRIEF DESCRIPTION OF THE DRAWINGS

FIG. 6 is a diagram illustrating an example of a screen displayed on the external apparatus when the setting is to be initialized.

FIG. 7 is a diagram illustrating an example of a screen for explaining that removal of registration is needed separately.

DESCRIPTION OF THE EMBODIMENTS

Example embodiments for implementing the present disclosure will be described below with reference to the accompanying drawings.

Figure 1:
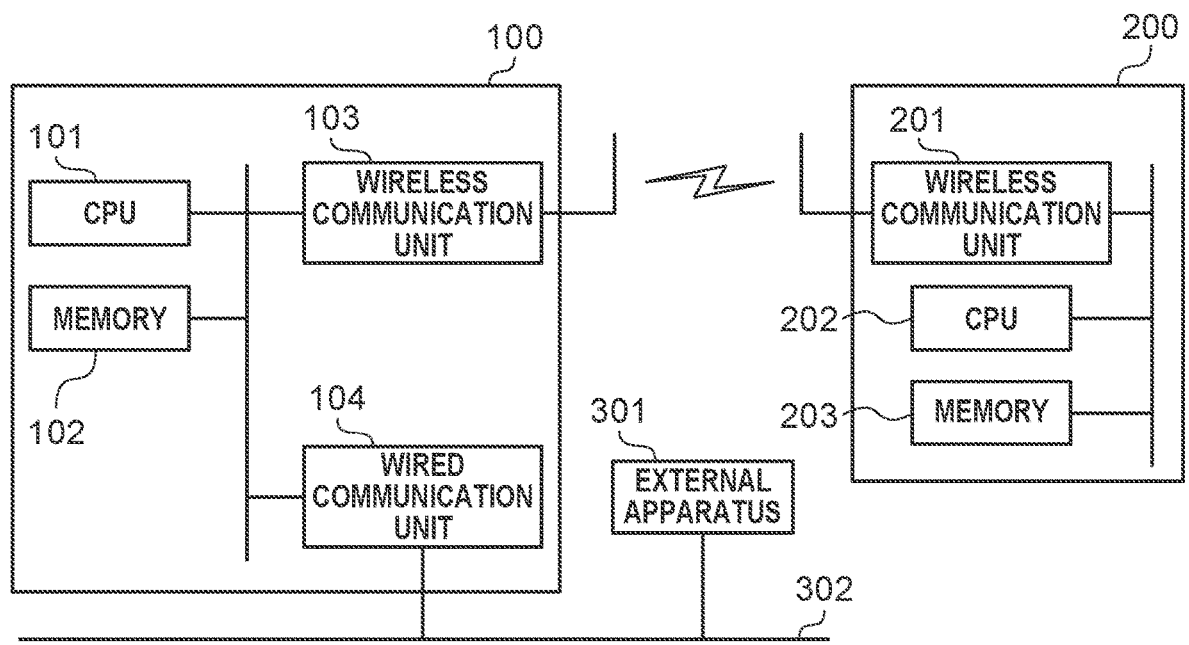
FIG. 1 is a block diagram illustrating a configuration example of a system according to an example embodiment.

A configuration of a system according to an example embodiment is described with reference to a block diagram illustrated in FIG. 1.

The present system includes a communication parent device 100 and a communication child device 200. The communication parent device 100 is connected to an external apparatus 301 using a wired connection via a network 302.

The communication parent device 100 includes a central processing unit (CPU) 101, a memory 102, a wireless communication unit 103, and a wired communication unit 104.

The CPU 101 reads out a program stored in the memory 102 and executes various kinds of processing. The memory 102 is composed of one or more memories, such as a read-only memory (ROM), a random-access memory (RAM), and a hard disk.

The wireless communication unit 103 is a control unit for communicating with the communication child device 200, which is an external communication apparatus, using wireless communication.

The wired communication unit 104 is a control unit for communicating with the external apparatus 301 via the network 302.

Functions and processing of the communication parent device 100, which will be described below, are implemented by the CPU 101 reading out a program stored in the memory 102 and executing the program.

The communication child device 200 includes a wireless communication unit 201, a CPU 202 and a memory 203.

The wireless communication unit 201 is a control unit for communicating with the communication parent device 100, which is an external communication apparatus, using wireless communication.

The CPU 202 and the memory 203 are equivalent to the CPU 101 and the memory 102, respectively.

The external apparatus 301 is an apparatus that is used by a user of the communication parent device 100 to operate the communication parent device 100 or that is used to display information from the communication parent device 100. The external apparatus 301 incorporates an operation unit for accepting an operation performed by the user and a display unit for displaying information to the user.

The network 302 is a communication medium between the communication parent device 100 and the external apparatus 301.

The external apparatus 301, the network 302, and the wired communication unit 104 are used for inputting an operation performed by the user and issuing a notification of information to the user. The external apparatus 301, the network 302, and the wired communication unit 104 are not essential components of the system, and thus may be omitted.

The operation unit and the display unit may be disposed inside the communication parent device 100.

The communication parent device 100 and the communication child device 200 perform registration processing with respect to each other, for the purpose of communication using radio waves. Performing the registration processing in the communication parent device 100 and the communication child device 200 with respect to each other establishes a wireless communication system and enables wireless communication with each other.

The registration processing in communication apparatuses with respect to each other is now described. In the following description, the communication apparatuses are referred to as a parent device and a child device to distinguish them from each other based on respective roles.

The registration processing has two major roles. One of the roles is to determine connection between devices, which enables identification of a communication partner for communication between devices that are not physically connected. The other of the roles is to authenticate each other to perform communication limited between the connected devices to ensure safety, whereby interception or spoofing by the third party can be prevented. Depending on a communication standard, pairing as information exchange processing for performing data encryption is performed as necessary.

In the registration processing using Wireless Fidelity (Wi-Fi), a parent device holds unique identification (service set identifier (SSID)) and a password, which are used in a case where a child device is connected to the parent device. Communication is established between the parent device and the child device when authentication with the password succeeds. Because of the characteristic of the authentication method, the parent device usually does not manage child devices and accepts communication from an unspecified number of child devices. Thus, leakage of the password may possibly result in immense harm. Further, registering the child device in a new parent device requires simply a SSID and a password of the new parent device.

In the registration processing using Bluetooth®, a user performs a specific operation (usually pressing and holding down a button, or the like) on the parent device and the child device almost at the same time, during which the parent device and the child device exchange encryption keys with each other, which allows the parent device and the child device to perform encrypted data communication. Depending on circumstances, the user additionally enters numbers (personal identification number (PIN) code), and verifies validity of encryption keys between the parent device and the child device. Since an operation needs to be performed on each of the parent device and the child device, a specific child device can be selectively registered. Further, registering the child device in a new parent device requires simply the above-described operation on the child device and the new parent device.

In terms of the registration processing method, among other wireless communication standards are also similar to Bluetooth® (specific operation and entry of PIN code).

On the other hand, in a case using a communication standard, such as Z-Wave, a child device cannot be registered in a new parent device unless registration of the child device in the parent device is removed, in terms of security and the like. Communication between the communication parent device 100 and the communication child device 200 according to the present example embodiment is described taking a case using a communication standard with such a restriction, as an example.

Figure 2:
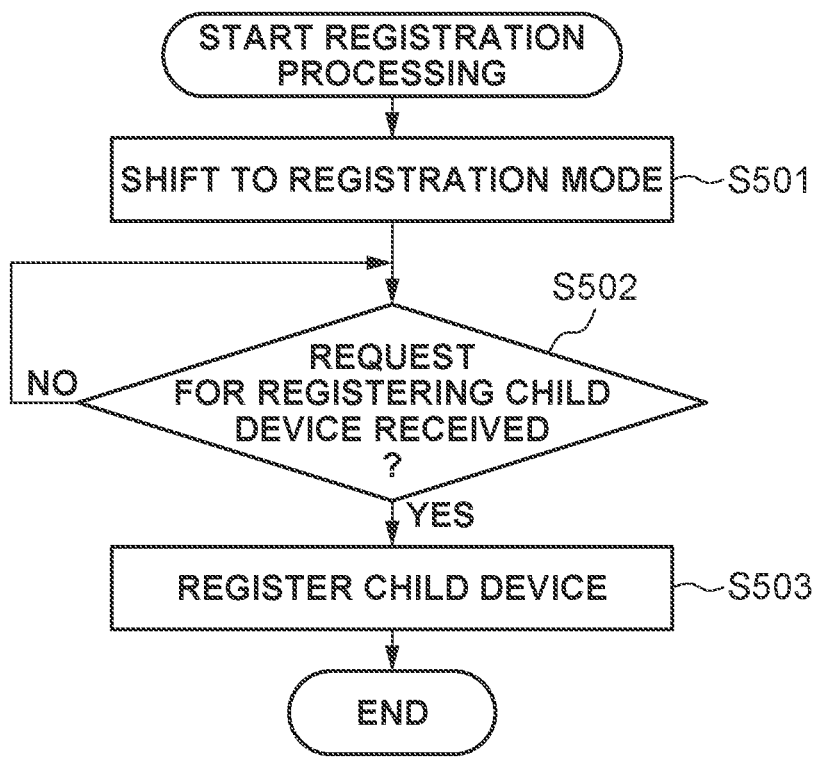
FIG. 2 is a flowchart describing a procedure example of registration processing for registering a child device according to the example embodiment.

Subsequently, the procedure of registration processing for registering the communication child device 200 in the communication parent device 100 is described with reference to the flowchart in FIG. 2. In response to the user issuing an instruction for starting registration of the communication child device 200 via the external apparatus 301, the processing is started.

First, in step S501, the CPU 101 of the communication parent device 100 shifts the wireless communication unit 103 to a registration mode for accepting a registration request from the communication child device 200.

In step S502, the CPU 101 waits until the communication parent device 100 receives the registration request from the communication child device 200 via the wireless communication unit 103. The registration request is transmitted by the CPU 202 to the communication parent device 100 via the wireless communication unit 201 in response to the user's operation performed on the communication child device 200. In a case where the CPU 101 determines that the communication parent device 100 has received the registration request (YES in step S502), the processing proceeds to step S503. In a case where the CPU 101 determines that the communication parent device 100 has not received the registration request (NO in step S502), the processing of step S502 is repeated.

In step S503, after exchanging information regarding capability, performance, and the like of the own communication apparatuses between the communication parent device 100 and the communication child device 200, the CPU 101 registers the communication child device 200 as a child device, and ends the processing.

Specifically, for example, the communication parent device 100 associates ID of the communication child device 200 and the information regarding capability, performance, and the like of the communication child device 200 with each other, stores the ID and the information in the memory 102, whereby registration of the communication child device 200 is completed. The communication child device 200 associates ID of the communication parent device 100 and information regarding capability, performance, and the like of the communication parent device 100 with each other, and stores the ID and the information in the memory 203. The information that is exchanged in the registration processing includes information regarding ID of a device, a sensor type of a human detection sensor, an infrared radiation sensor, or the like, and setting items, such as an operation interval of the device, a dead time of the device, a remaining battery level, and a sleep time.

The procedure of registration removal processing for removing registration of the communication child device 200 from the communication parent device 100 is described with reference to the flowchart in FIG. 3. In response to the user issuing an instruction for starting removal of the registration of the communication child device 200 via the external apparatus 301, the processing is started.

In step S510, the CPU 101 of the communication parent device 100 shifts the wireless communication unit 103 to a registration removal mode for accepting a registration removal request from the communication child device 200.

In step S511, the CPU 101 waits until the communication parent device 100 receives the registration removal request from the communication child device 200 via the wireless communication unit 103. The registration removal request is transmitted by the CPU 202 to the communication parent device 100 via the wireless communication unit 201 in response to the user's operation performed on the communication child device 200. In a case where the CPU 101 determines that the communication parent device 100 has received the registration removal request (YES in step S511), the processing proceeds to step S512. In a case where the CPU 101 determines that the communication parent device 100 has not received the registration removal request (NO in step S511), the processing of step S511 is repeated In step S512, the CPU 101 deletes the communication child device 200 registered as the child device, and then ends the processing. In this processing, the CPU 101 transmits, to the communication child device 200, a notification notifying that the registration is removed, and deletes information for the registration from the memory 102. In a case where the communication child device 200 receives the notification about the removal of the registration, the CPU 202 deletes information regarding the communication parent device 100, such as the ID of the communication parent device 100, from the memory 203.

Figure 4:
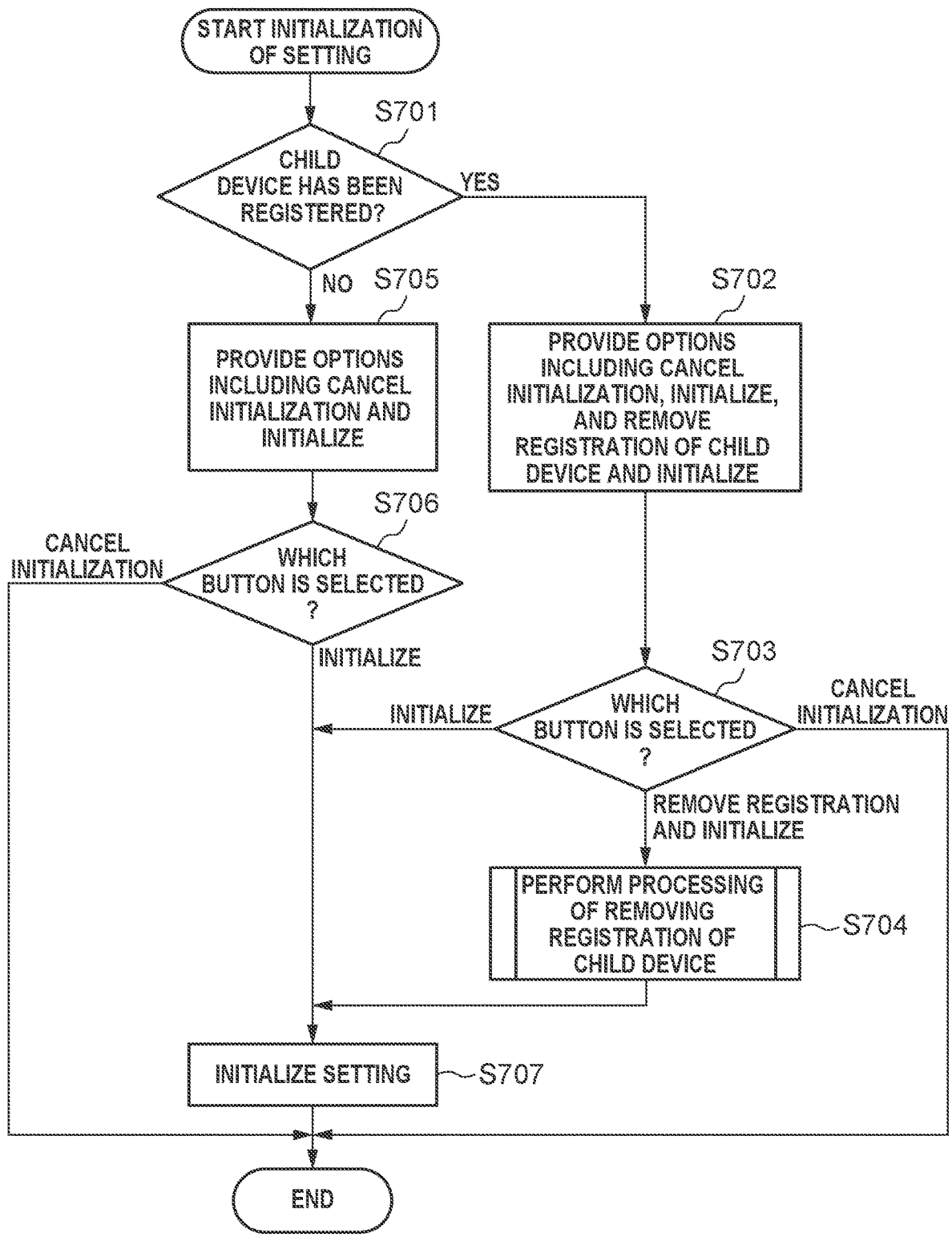
FIG. 4 is a flowchart describing a procedure example of initialization processing for initializing a setting according to the example embodiment.

The procedure of processing in initializing a setting of the communication parent device 100 is described with reference to the flowchart in FIG. 4, and screen display examples in FIGS. 5 and 6. This processing is performed in the communication parent device 100 in a case where the communication parent device 100 receives an instruction for initializing a setting, and the communication parent device 100 checks whether the communication child device 200 has been registered and removes the registration of the communication child device 200 as necessary. In response to the user issuing an instruction for initializing the communication parent device 100 via the external apparatus 301, the processing is started.

In step S701, the CPU 101 of the communication parent device 100 determines whether the communication child device 200 has been registered. In a case where the CPU 101 determines that the communication child device 200 has been registered (YES in step S701), the processing proceeds to step S702. On the other hand, in a case where the CPU 101 determines that the communication child device 200 has not been registered (NO in step S701), the processing proceeds to step S705.

In step S702, the CPU 101 transmits information to request the external apparatus 301 to display a screen illustrated in FIG. 6, to notify the user that the communication child device 200 has been registered and there are options for the next processing. In the display example in FIG. 6, options including canceling initialization of the setting, initializing the setting without removing the registration of the communication child device 200, and removing the registration of the communication child device 200 and initializing the setting are provided. With this notification, the user can recognize that the communication child device 200 has been registered, and select appropriate processing.

In step S703, the CPU 101 receives an instruction for the next processing from the external apparatus 301, and determines a content of the instruction. In a case where the CPU 101 determines that an instruction for removing the registration of the communication child device 200 and initializing the setting is received (REMOVE REGISTRATION AND INITIALIZE in step S703), the processing proceeds to step S704. In a case where the CPU 101 determines that an instruction for initializing the setting without removing the registration of the communication child device 200 is received (INITIALIZE in step S703), the processing proceeds to step S707. In a case where the CPU 101 determines that an instruction for canceling initialization of the setting is received (CANCEL in step S703), the procedure of the processing ends.

Figure 3:
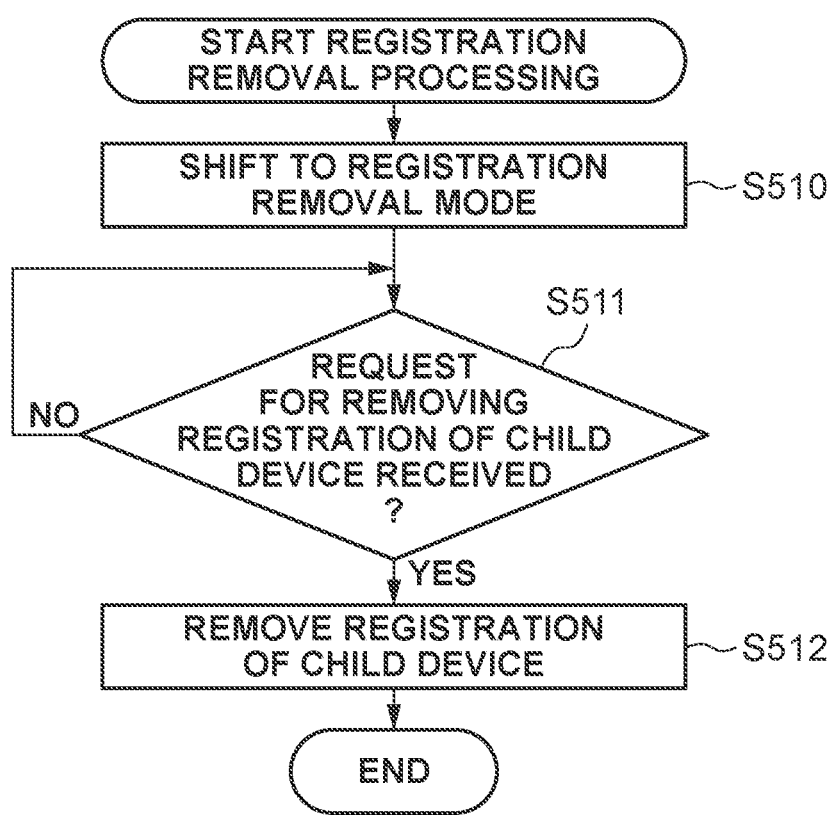
FIG. 3 is a flowchart describing a procedure example of registration removal processing for removing registration of the child device according to the example embodiment.

In step S704, the CPU 101 performs the above-mentioned registration removal processing of removing the registration of the child device in FIG. 3.

Figure 5:
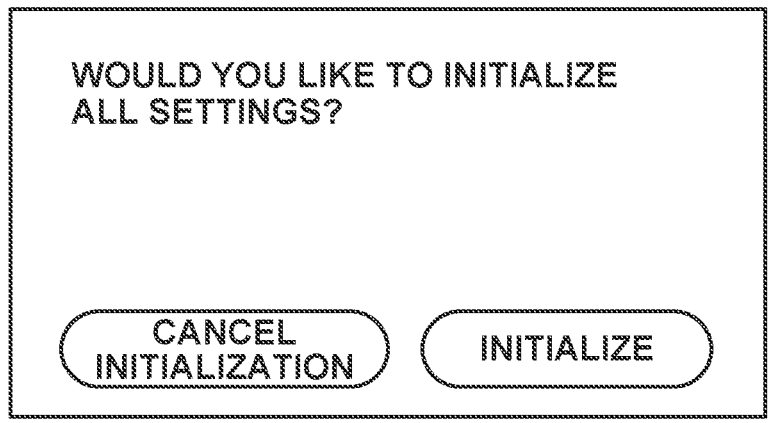
FIG. 5 is a diagram illustrating an example of a screen displayed on an external apparatus when the setting is to be initialized.

In step S705, the CPU 101 transmits information to the external apparatus 301 to request the external apparatus 301 to display a screen illustrated in FIG. 5, and notifies the user that there are options for the next processing. In the display example in FIG. 5, options including canceling the initialization of the setting and initializing the setting are provided.

In step S706, the CPU 101 receives an instruction for the next processing from the external apparatus 301, and determines a content of the instruction. In a case where the CPU 101 determines that an instruction for initializing the setting is received (INITIALIZE in step S706), the processing proceeds to step S707. On the other hand, in a case where the CPU 101 determines that an instruction for canceling the initialization of the setting is received (CANCEL INITIALIZATION in step S706), the procedure of the processing ends.

In step S707, the CPU 101 deletes various kinds of setting information in the communication parent device 100 to initialize the communication parent device 100. The various kinds of setting information mentioned herein are information of settings regarding the communication parent device 100 itself included in the communication parent device 100 or information of settings regarding the communication child device 200. Examples of the settings include a setting of time and date of the communication parent device 100, a setting of a network of the communication parent device 100, a name of the communication child device 200, and operation conditions of the communication child device 200, and the like, and settings not relevant to the present example embodiment are also included in the examples of the setting.

According to the present example embodiment, in a case where initialization of the communication parent device 100 is instructed, the registration of the communication child device 200 is removed, and then the communication parent device 100 is initialized, as described above. This configuration can eliminate the need for initialization of the child device especially in a case using a wireless communication standard that does not allow the child device to be newly registered in another parent device unless the registration state between the parent device and the child device is removed, whereby re-registration between parent and child devices can be smoothly performed, which increases convenience for the user. In a case where the CPU 101 determines that the instruction for initializing the setting without removing the registration of the communication child device 200 is received in step S703, the processing proceeds to step S707, but the CPU 101 may alternatively present a checking screen before the processing proceeds to step S707. For example, in a case where "INITIALIZE" is selected by the user on the screen illustrated in FIG. 6, the CPU 101 transmits information to the external apparatus 301 to request the external apparatus 301 to display a screen illustrated in FIG. 7, to notify the user that removing the registration of the communication child device 200 is needed separately. In a case where "YES" is selected by the user on the screen illustrated in FIG. 7, the processing may proceed to step S707. In a case where "BACK" is selected, the screen may return to the screen illustrated in FIG. 6.

In the present example embodiment, as illustrated in FIG. 6, the user can select from three options of "CANCEL INITIALIZATION", "INITIALIZE", and "REMOVE REGISTRATION AND INITIALIZE", but the options may be reduced to two options including "CANCEL INITIALIZATION" and "REMOVE REGISTRATION AND INITIALIZE". That is, the initialization processing may not be able to be performed in a case where the registration of the communication child device 200 is not removed.

Alternatively, the removal of the registration of the communication child device 200 and initialization may be automatically performed without presenting the checking screen like the screen illustrated in FIG. 6. In this case, in a case where the CPU 101 determines that the communication child device 200 has been registered in step S701, the processing proceeds to step S704.

In the present example embodiment, the description has been given of a case using a communication standard specifying that, unless the registration of the communication parent device 100 is removed from the communication child device 200, registration for performing communication with a different communication apparatus cannot be made. However, the present example embodiment may be applied to a case using a communication standard specifying that a plurality of communication apparatuses can be registered in a child device. Because of the processing procedures in FIG. 3, the user can immediately recognize that the communication child device 200 cannot communicate with the communication parent device 100 due to deletion of the registration information with respect to the communication parent device 100. Thus, even in a case where the parent device is initialized, the user can immediately recognize that re-registration needs to be performed on the child device, whereby convenience for the user can be increased.

Other Embodiments

Various embodiments of the present disclosure can also be implemented by installing a program that implements one or more functions of the example embodiments described above in a system or an apparatus via a network or a storage medium, and one or more processors in the system or a computer of the apparatus loading and executing the program. Furthermore, various embodiments of the present disclosure can be implemented by a circuit (for example, an application specific integrated circuit (ASIC)) that implements one or more functions.

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-118662, filed Jul. 19, 2021, which is hereby incorporated by reference herein in its entirety.

What is claimed is:

1. A communication apparatus that forms a wireless communication system together with an external communication apparatus, by the communication apparatus and the external communication apparatus mutually registering each other as apparatuses capable of performing communication, the communication apparatus comprising:
one or more processors;
one or more memories including instructions stored thereon that, when executed by the one or more processors, cause the communication apparatus to function as:

a determination unit configured to determine, in response to receipt of an instruction for initialization, whether an external communication apparatus registered in the wireless communication system is present within a communication range; and a notification unit configured to issue, in a case where the determination unit determines that a registered external communication apparatus is present within the communication range, a notification for removing registration of the registered external communication apparatus before the initialization is performed.

2. The communication apparatus according to claim 1, further comprising:

a removal unit configured to remove, in response to receipt of an instruction based on the notification issued by the notification unit, the registration of the registered external communication apparatus; and an initialization unit configured to perform the initialization after the removal unit removes the registration.

3. The communication apparatus according to claim 1, wherein the notification unit is configured to issue a notification providing options which allow a user to select whether to remove the registration of the registered external communication apparatus before the initialization is performed.

4. The communication apparatus according to claim 3, wherein, in a case where an instruction not to remove the registration of the registered external communication apparatus is received, the notification unit is configured to issue a notification notifying that removal of the registration of the registered external communication apparatus needs to be performed separately.

5. The communication apparatus according to claim 2, wherein, in a case where the removal unit has not removed the registration of the registered external communication apparatus, the initialization unit is configured not to perform the initialization.

6. The communication apparatus according to claim 1, wherein the wireless communication system is a system based on a communication standard specifying that, in the external communication apparatus, registration for communication with a different communication apparatus cannot be performed unless registration of the communication apparatus is removed.

7. A control method for a communication apparatus that forms a wireless communication system together with an external communication apparatus, by the communication apparatus and the external communication apparatus mutually registering each other as apparatuses capable of performing communication, the method comprising:

determining, in response to receipt of an instruction for initialization, whether an external communication apparatus registered in the wireless communication system is present within a communication range; and issuing, in a case where the determining determines that a registered external communication apparatus is present within the communication range, a notification for removing registration of the registered external communication apparatus before the initialization is performed.

8. A non-transitory storage medium that includes a program that causes a computer to function as the communication apparatus according to claim 1.

* * * * *